Patented May 6, 1947

2,419,943

UNITED STATES PATENT OFFICE 2,419,943

PREPARATION OF SULFUR-CONTAINING POLYMERS

William James Burke, Marshallton, Del., assignor to E. I. du Pont de Nemours & Company, Wilmington, Del., a corporation of Delaware No Drawing. Application September 22, 1943, Serial No. 503,417

10 Claims. (Cl. 260—768)

This invention relates to the preparation of polymeric thiolcarboxylates.

It is known that such thiolcarboxylic acids as thiolacetic acid can be added to monomeric unsaturated compounds. It has not, however, been known heretofore to add thiolcarboxylic acids to unsaturated polymers.

It is accordingly an object of this invention to provide new polymeric thiolcarboxylates. Another object is to provide thiolcarboxylates of unsaturated linear polymers containing olefinic unsaturation. A further object is to provide thiolcarboxylates of linear diene hydrocarbon polymers and particularly of natural rubber. Another object is to provide simple, practical methods for preparing such products. Other objects will appear hereinafter.

These objects are realized by reacting a thiolcarboxylic, i. e., carbothiolic, acid with a poly-unsaturated macromolecular polymer containing olefinic unsaturation, preferably in the presence of a peroxy compound catalyst, until at least one mole of the acid has combined chemically per four olefinic double bonds in the polymer.

In one form of practicing the invention, an unsaturated polymer containing olefinic unsaturation, e. g., natural rubber, is reacted with thiolacetic acid in the presence of a peroxy compound catalyst and of an organic solvent which is unreactive with the thiolacetic acid, e. g., dioxane, benzene, xylene, gasoline, and other aromatic and aliphatic hydrocarbons at a temperature in the range of from 15° C. to the boiling point of the solvent at atmospheric pressure. In general, the thiolacetic acid is used in amounts in excess of 1 mole per 4 olefin double bonds in the polymer. If desired, the unsaturated polymer may be reacted with the thiolacetic acid in the absence of a solvent or diluent.

The preferred products produced in accordance with this invention are those in which at least one molecule of thiolcarboxylic acid has reacted per two olefin double bonds in the polymer because such products show good solubility characteristics in organic solvents and are readily insolubilized by hydrolysis followed by oxidation.

The more detailed practice of the invention is illustrated by the following examples, wherein parts given are by weight. There are, of course, many forms of the invention other than these specific embodiments.

Example I

Forty-five grams of thiolacetic acid and 0.6 gram of ascaridole are added to a solution of 20 grams of natural rubber in 180 grams of benzene. Oxygen is bubbled through the solution for five minutes and the reactor is tumbled at room temperature. At the end of 48 hours oxygen is again bubbled through the solution for five minutes and the oxygen treatment is repeated after 96 hours. After 10 days at room temperature, methanol is slowly added to the vigorously agitated reaction mixture. The finely divided white solid which separates out is thoroughly washed with methanol until the odor of thiolacetic acid is no longer detectable. The product is separated by filtration, washed with methanol once, then with water, and finally dried in a vacuum desiccator over phosphorous pentoxide. The white granular product thus obtained contains 20.2% sulfur, indicating that thiolacetic acid added to 85% of the double bonds of the rubber. The product formed by addition of thiolacetic acid to all of the double bonds of rubber has a calculated sulfur content of 22.2%.

The polymeric thiolacetate prepared as described above gives clear films from benzene solution and is soluble in dioxane and acetone. The product is readily insolubilized by treatment with an alcoholic solution of sodium methylate, followed by exposure to air.

Results similar to the above are obtained when the rubber is replaced by an unsaturated condensation polymer such as a glycerol-phthalic anhydride-linoleic acid condensate or a methallyl alcohol-para-amylphenol-formaldehyde condensate.

Example II

Thirteen grams of thiolacetic acid and 0.4 gram of ascaridole are added to a solution of 8 grams of a butadiene/styrene polymer in 200 grams of benzene. The polymer is prepared according to the procedure of U. S. Patent 1,938,731 from 75 grams of butadiene and 25 grams of styrene so that 1.55 moles of thiolacetic acid are used for each diene unit present in the polymer. Oxygen is bubbled through the solution and the reactor is tumbled at room temperature for 24 hours. Oxygen is again bubbled through the reaction mixture for five minutes and at the end of 72 hours methanol is added slowly to the agitated reaction mixture. The product separates out as a grayish-white, finely divided material which is washed thoroughly with methanol and water. After drying in a desiccator over phosphorous pentoxide, the product is analyzed and found to contain 17.7% sulfur. This indicates that thiolacetic acid has added to the double bond of about 7 out of each 10 butadiene residues. Stated in another way, this means that the thiolacetic acid has reacted with 68% of the double bonds present in the original polymer.

The product is soluble in dioxane and benzene and insoluble in methanol. The thiolacetate thus obtained is readily converted to the corresponding thiol by treatment with an excess (over that theoretically required) of 10% alcoholic sodium hydroxide, followed by acidification with acetic acid and washing with water. By controlling the amount of alkali used, or the time of hydrolysis, it is possible to obtain any desired degree of saponification, thus making it possible to obtain polymers having both thiol and thiolacetate groups. The thiol-containing products upon exposure to air, or more rapidly by treatment with hydrogen peroxide and other peroxy compounds, are insolubilized.

Similar results are obtained with other polymers such as those obtained by polymerizing dimethyl-2,3-butadiene-1,3 or a mixture of butadiene-1,3 with isobutylene.

In the process of this invention there can be used any naturally occurring or synthetic macromolecular polymeric material containing olefinic unsaturation. The polymers are polyunsaturated and have an unsaturation corresponding to an iodine number of at least 25. Examples of operable polymers, in addition to those illustrated by the examples, are the unsaturated condensation polymers such as the polyesters, polyethers, polysulfides, polyamide-polyesters, polyacetals, etc., prepared from components at least one of which contains an olefinic double bond; unsaturated alcohol - modified urea - formaldehyde, melamine-formaldehyde and phenol-formaldehyde polymers; and the unsaturated derivatives of such film-forming materials as starch, polyvinyl alcohol, wool, reduced wool, casein, silk, etc.; the linear diene polymers obtained by polymerizing diene hydrocarbons alone and in admixture with one another or in admixture with other polymerizable organic compounds. Examples of such dienes are butadiene-1,3, isoprene, dimethyl-2,3-butadiene-1,3 and the like. Examples of unsaturated organic compounds which can be polymerized with the above dienes are styrene, pinene, isobutylene, camphene, monovinylacetylene, etc.; vinylethinyl alkyl carbinols, vinyl acetate, vinyl chloride, unsaturated aldehydes and ketones, such as acrolein, methyl vinyl ketone, etc.; acrylic and methacrylic acids and their esters, nitriles, amides and imides, e. g., butyl acrylate, methyl methacrylate, acrylonitrile, etc.; alpha-chloroacrylic acid and its esters, e. g., methyl alpha-chloroacrylate, etc.; furylacrylic acid and its esters, e. g., methyl furylacrylate, etc.; esters of 1,4-butenedioic acids such as dimethyl fumarate, etc.

The term "polymer" is used in the description and claims to refer to a macromolecular organic compound containing a plurality of recurring units which are joined together in a chain-like manner.

In place of thiolacetic acid, other thiolcarboxylic, i. e., carbothiolic, acids such as thiolpropionic acid, thiolbutyric acid, thiolhexanoic acid, thiolbenzoic acid, etc., can be used. The preferred acids, however, are the aliphatic thiolcarboxylic acids and of these, because of its ready reactivity at ordinary temperatures and availability, thiolacetic is particularly preferred.

The process of this invention is generally and preferably carried out in the presence of substances containing a peroxy linkage. Examples of suitable catalysts in place of those in the examples are peracetic acid, perbenzoic acid, etc.

The organic solvent soluble polymers are preferred in the practice of this invention because they react readily at moderate temperatures and yield products which are specially useful since they can be readily insolubilized during or after being formed into shaped articles. The organic solvent soluble polymers, including copolymers, of acyclic conjugated diene hydrocarbons constitute a particularly preferred embodiment since they react with thiolcarboxylic acids with exceptional ease to give products especially useful as water-resistant coating compositions which can be made resistant to organic solvents by hydrolysis, followed by oxidation.

The process of this invention is generally carried out at atmospheric pressure and at temperatures above 15° C. In the presence of a solvent, a temperature up to that of the boiling reaction mixture at atmospheric pressure can be employed.

The products of this invention are useful as coating composition ingredients, in the preparation of films, etc. They can also be hydrolyzed with alkalies or with acids and the resulting polymeric thiols insolubilize by oxidation with the formation of disulfide crosslinks. These crosslinked polymers are much more solvent resistant than the original polymers. Products having a ratio of acylthio groups of at least one per four double bonds in the original polymer (one acylthio group per three double bonds in the reaction product) differ in solubility, swellability and in other properties from the original polymer. Thus products of this invention upon hydrolysis and subsequent oxidation, crosslink with great ease to give insoluble products. The peroxy compound catalyst appears to be necessary in order to introduce this important ratio in a reasonably practical time.

A subgenus under this invention is that of my copending application Serial No. 525,093, filed March 4, 1944.

The above description and examples are intended to be illustrative only. Any modification of or variation therefrom which conforms to the spirit of the invention is intended to be included within the scope of the claims.

What is claimed is:

1. Process for preparing sulfur-containing materials which comprises reacting an ethylenically polyunsaturated macromolecular polymer having an iodine number of at least 25 with a monocarbothiolic acid, in amount preponderating over that of the polymer, in the presence of a peroxy catalyst until at least one mole of the monocarbothiolic acid is introduced per four ethylenic linkages in the polymer.

2. Process for preparing sulfur-containing materials which comprises reacting a macromolecular polymer of a conjugated diene hydrocarbon with an aliphatic monocarbothiolic acid, in amount preponderating over that of the polymer, in the presence of a peroxy catalyst until at least one mole of the monocarbothiolic acid is introduced per four ethylenic linkages in the polymer.

3. Process for preparing sulphur-containing materials which comprises reacting a macromolecular polymer of a conjugated diene hydrocarbon with thiolacetic acid, in amount preponderating over that of the polymer, in the presence of a peroxy catalyst until at least one mole of the thiolacetic acid is introduced per four ethylenic linkages in the polymer.

4. Process for preparing sulphur-containing derivatives of rubber which comprises reacting rubber with thiolacetic acid, in amount preponderating over that of the rubber, in the presence of a peroxy catalyst until at least one mole of thiolacetic acid is introduced per two ethylenic linkages in the rubber.

5. A reaction product of thiolacetic acid and a butadiene-styrene macromolecular polymer, said reaction product having from one to two acetylthio, $CH_3—CO—S—$, radicals per two ethylenic linkages of said polymer.

6. A reaction product of thiolacetic acid with rubber, said reaction product having from one to two acetylthio, $CH_3—CO—S—$, radicals per two ethylenic linkages of the rubber.

7. A reaction product of an ethylenically polyunsaturated macromolecular polymer having an iodine number of at least 25 and a monocarbothiolic acid, said reaction product having from one to four acylthio groups per four ethylenic linkages in said polymer.

8. A reaction product of a monocarbothiolic acid and a macromolecular polymer of a conjugated diene hydrocarbon, said reaction product having from one to four acylthio groups per four ethylenic linkages in said polymer.

9. Process for preparing sulfur-containing materials which comprises reacting an ethylenically polyunsaturated macromolecular polymer having an iodine number of at least 25 with a monocarbothiolic acid, in amount preponderating over that of the polymer, in the presence of a peroxy catalyst until at least one mole of the monocarbothiolic acid is introduced per four ethylenic linkages in the polymer and hydrolyzing the polymeric thiolcarboxylate.

10. A hydrolyzed reaction product of a monocarbothiolic acid and an ethylenically polyunsaturated macromolecular polymer of iodine number of at least 25, said hydrolyzed reaction product having from one to four thiol groups per four ethylenic linkages in said polymer.

WILLIAM JAMES BURKE.

REFERENCES CITED

The following references are of record in the file of this patent:

UNITED STATES PATENTS

| Number | Name | Date |
| --- | --- | --- |
| 2,191,266 | Williams, et al. | Feb. 20, 1940 |
| 2,234,204 | Starkweather, et al. | Mar. 11, 1941 |
| 2,264,376 | Hiltner, et al. | Dec. 2, 1941 |
| 2,227,517 | Starkweather, et al. | Jan. 7, 1941 |
| 2,137,584 | Ott | Nov. 22, 1938 |

FOREIGN PATENTS

| Number | Country | Date |
| --- | --- | --- |
| 542,645 | British | Jan. 21, 1942 |
| 549,759 | German | Apr. 30, 1932 |

OTHER REFERENCES

Ipatieff, et al., art. in J. Am. Chem. Soc., 61, 71-4, 1939, abstracted in Chem. Abs., 33, 1659, 1939.

Rubber Chem. & Techn., vol. 12 of 1939, pages 556–567, see particularly page 569, par. (b) in IV.